US 7,086,865 B2

(12) United States Patent
Randhawa

(10) Patent No.: US 7,086,865 B2
(45) Date of Patent: Aug. 8, 2006

(54) EDUCATIONAL GAME

(76) Inventor: Kuldip Randhawa, 12859, 107 Avenue, Surrey, B.C. (CA) V3T 2E8

( * ) Notice: Subject to any disclaimer, the term of this patent is extended or adjusted under 35 U.S.C. 154(b) by 0 days.

(21) Appl. No.: 10/484,235

(22) PCT Filed: Jul. 17, 2002

(86) PCT No.: PCT/CA02/01113

§ 371 (c)(1),
(2), (4) Date: Jul. 30, 2004

(87) PCT Pub. No.: WO03/009256

PCT Pub. Date: Jan. 30, 2003

(65) Prior Publication Data

US 2005/0074734 A1    Apr. 7, 2005

Related U.S. Application Data

(60) Provisional application No. 60/305,609, filed on Jul. 17, 2001.

(51) Int. Cl.
*G09B 19/22* (2006.01)

(52) U.S. Cl. ..................................................... 434/129

(58) Field of Classification Search ................ 434/128, 434/129, 130, 167, 172, 188, 209; 273/287–288, 273/296, 299–302, 308–309, 148 A, 239
See application file for complete search history.

(56) References Cited

U.S. PATENT DOCUMENTS

| 4,470,821 | A | * | 9/1984 | LeCapelain | 434/172 |
| 4,682,777 | A | * | 7/1987 | Wood | 273/243 |
| 4,801,149 | A | * | 1/1989 | Alnafissa | 273/302 |
| 4,889,344 | A | * | 12/1989 | Zimba | 273/243 |
| 5,244,391 | A | * | 9/1993 | Bryant | 434/129 |
| 5,280,914 | A | * | 1/1994 | Selby et al. | 273/287 |
| 5,580,252 | A | * | 12/1996 | McCrady | 434/128 |
| 5,738,354 | A | * | 4/1998 | Easley | 273/249 |
| 5,810,355 | A | * | 9/1998 | Trilli | 273/149 R |
| 5,836,587 | A | * | 11/1998 | Druce et al. | 273/296 |
| 5,868,390 | A | * | 2/1999 | Ripley | 273/287 |
| 6,419,229 | B1 | * | 7/2002 | Whittington et al. | 273/245 |
| 6,648,648 | B1 | * | 11/2003 | O'Connell | 434/188 |
| 6,676,414 | B1 | * | 1/2004 | MacHendrie et al. | 434/201 |
| 6,884,076 | B1 | * | 4/2005 | Clark et al. | 434/172 |

* cited by examiner

*Primary Examiner*—Kurt Fernstrom
(74) *Attorney, Agent, or Firm*—Brian L. Johnson; Davis Wright Tremaine LLP

(57) ABSTRACT

An educational game is provided, comprising a plurality of qualification cards for at least one subject, said qualification cards having a qualification question and a corresponding qualification answer; and a plurality of preparatory cards for at least one subject, said preparatory cards having a preparatory question and a corresponding preparatory answer wherein a player of the game, when presented with said qualification question and on providing said qualification answer, is presented with said preparatory question and on providing said preparatory answer, receives a score. A method for playing an educational game is provided, wherein a player's turn comprises receiving a qualification question; providing a qualification response to said qualification question; if said qualification response is the corresponding answer to said qualification question, receiving a preparatory question; providing a preparatory response to said preparatory question; and if said preparatory response is the corresponding answer to said preparatory question, receiving a score.

19 Claims, 3 Drawing Sheets

SIDE 1

SIDE 2

SECTION Y-Y

SECT X-X

US 7,086,865 B2

EDUCATIONAL GAME

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent Office file or records but otherwise reserves all copyright rights whatsoever.

TECHNICAL FIELDS

This invention relates generally to a game, and more particularly, an educational board game adapted to accommodate the differing skill levels and age of its players.

BACKGROUND

In a society that values education, tools to assist in learning are in demand for all age groups in all subject areas. For example, elementary school children use pictorial workbooks to learn basic mathematics. Tutoring programs are offered to high school students who may need extra help in chemistry. Preparatory courses and practice exam workbooks are available for university students preparing for qualification examinations to enrol in postgraduate programs. Regardless of age, skill level, and subject area, an effective method to learn is to make the learning process enjoyable and fun.

A number of educational games disclosed in the art target players of a specific age group. Such games are based on the limited scope of knowledge of players within the specific age group and therefore limit the extent to which skills may be developed in any given subject area. Furthermore, because most educational games in the art are so limited, simultaneous participation by players of different age and skill levels is not possible. For example, younger individuals in a group of players may feel left out when other older individuals are playing because the game is too difficult for them to play.

Other board games in the art utilize a game board and related parts for use in playing the game. The use of such board and related parts may make it difficult for a group of individuals to play because the game board often has to be moved to the face the players, resulting in many pieces of the game being disturbed. Alternatively, the game may be played with the information on the game board positioned upside down for some of the players.

Thus, it is an object of this invention to provide a means for individuals to learn the subject matter of a wide range of subject areas in an enjoyable and relaxed manner. More particularly, the present invention provides a means for individuals to learn about various subject areas in accordance with their academic needs.

It is a further object of this invention to enable individuals of differing age groups and skill levels to play simultaneously such that each player has a similar chance of winning the game.

It is a further object of this invention to permit the game to be played with ease by mounting the game board on a rotating drum, thereby allowing players to rotate the game board without disturbing the game pieces.

SUMMARY OF THE INVENTION

An educational game is provided, comprising a plurality of qualification cards for at least one subject, said qualification cards having a qualification question and a corresponding qualification answer; and a plurality of preparatory cards for at least one subject, said preparatory cards having a preparatory question and a corresponding preparatory answer wherein a player of the game, when presented with said qualification question and on providing said qualification answer, is presented with said preparatory question and on providing said preparatory answer, receives a score. A method for playing an educational game is provided, wherein a player's turn comprises receiving a qualification question; providing a qualification response to said qualification question; if said qualification response is the corresponding answer to said qualification question, receiving a preparatory question; providing a preparatory response to said preparatory question; and if said preparatory response is the corresponding answer to said preparatory question, receiving a score.

BRIEF DESCRIPTION OF FIGURES

Further objects, features and advantages of the present invention will become more readily apparent to those skilled in the art from the following description of the invention when taken in conjunction with the accompanying drawings, in which.

DETAILED DESCRIPTION OF PREFERRED EMBODIMENTS

Figure 1:
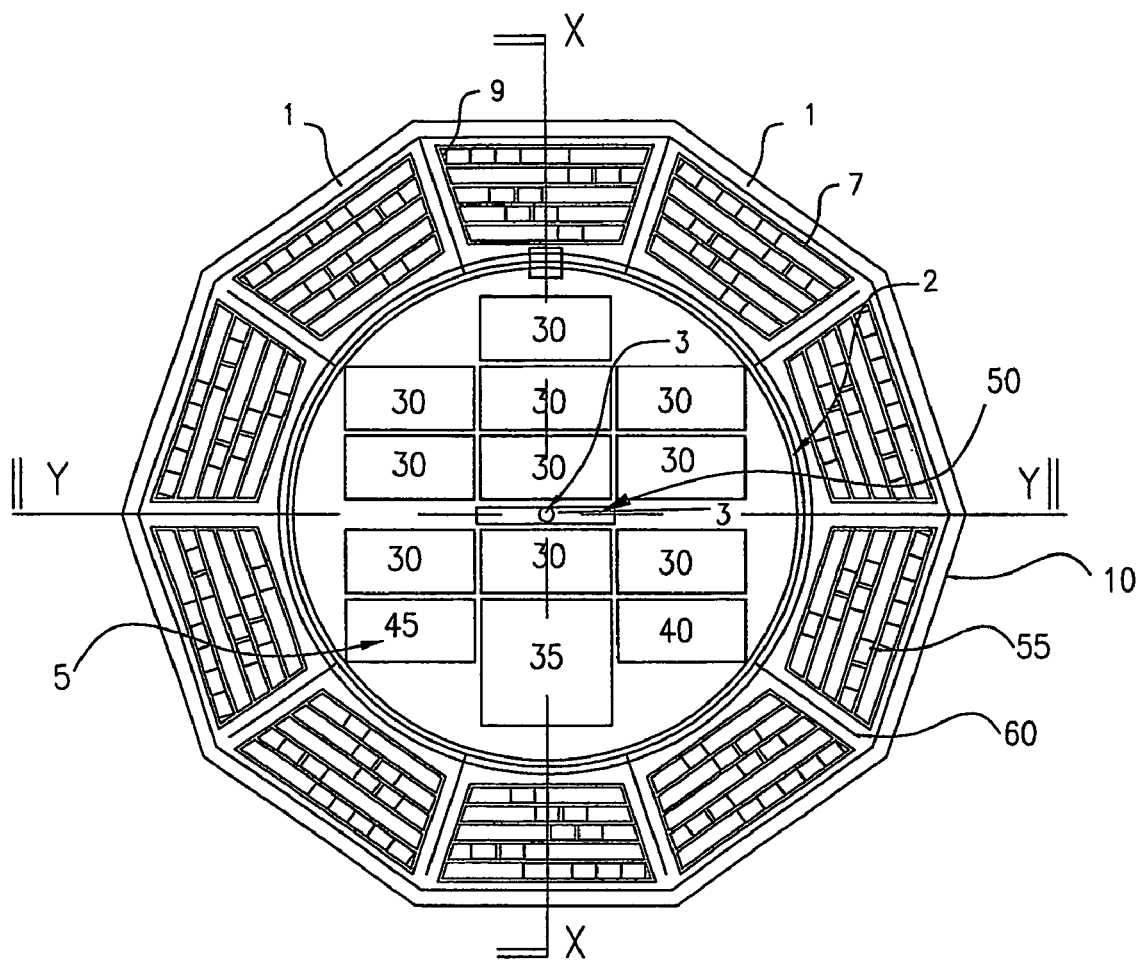
FIG. 1 is a top view of an embodiment of the game showing the stationary base and rotatable drum.
Figure 2:
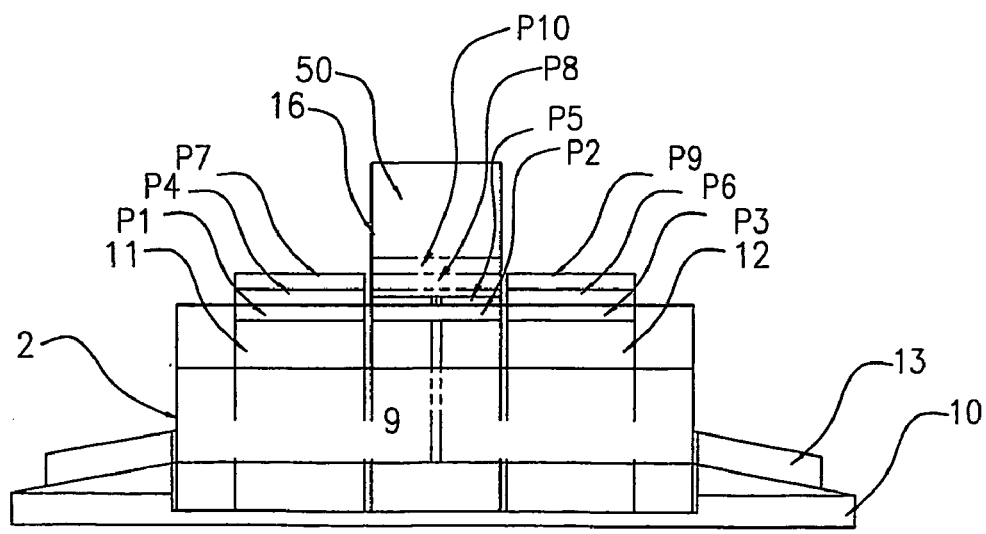
FIG. 2 is a cross sectional side view thereof taken along line Y—Y, showing the view from that of a player answering questions.
Figure 3:
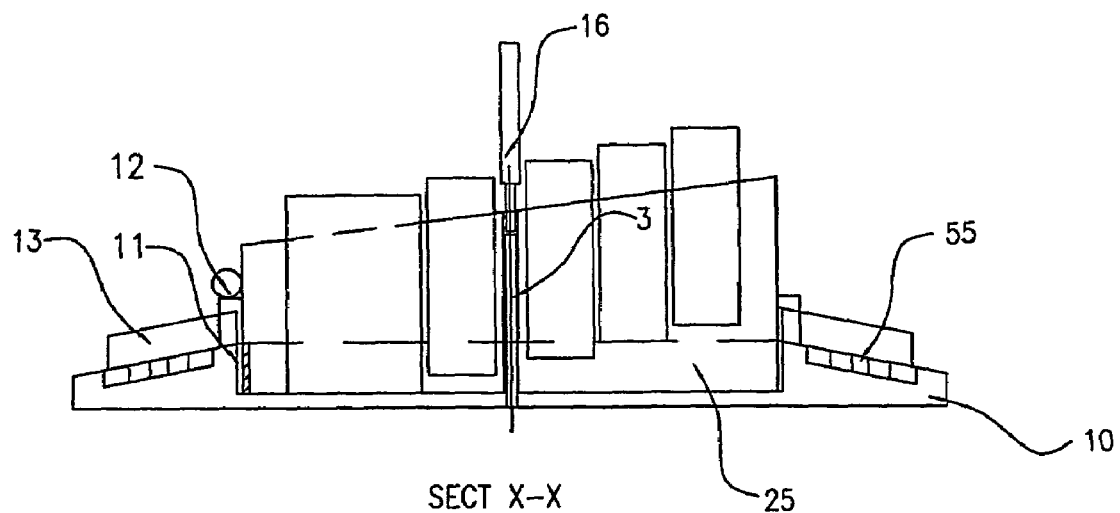
FIG. 3 is a cross sectional side view thereof taken along line X—X; showing the rotatable drum mounted via a pin onto the stationary base.
Figure 5:
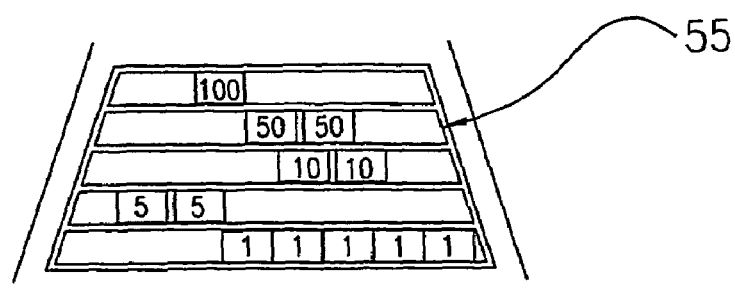
FIG. 5 is a view of a score register.

As illustrated in FIG. 2 and FIG. 3, educational game 1 includes stationary base 10, adapted to allow rotatable drum 15 to be mounted by means of a pin positioned substantially at the center of stationary base 10. Storage area 25 positioned underneath rotatable drum 15 is adapted to store a plurality of preparatory cards and qualification cards. As best seen in FIG. 1, positioned on top of rotatable drum 15 are a plurality of preparatory cardholder slots 30, a qualification cardholder slot 35, a mascot holder slot 40, a score counter holder slot 45, and a single preparatory cardholder slot 50. On the perimeter of stationary base 10 are a plurality of elongated slots organized into score registers 55 adapted to hold score counters received by each player, as best seen in FIG. 5. A privacy barrier 60 separates score registers 55 of each player.

Stationary base 10 is made of any solid material such as wood or stiff cardboard. In the preferred embodiment, stationary base 10 is made of a lightweight plastic such as polyethylene terepthalate (PET) or polyvinyl chloride (PVC). Stationary base 10 can be any shape including rectangular or circular, but is preferably octagonal or hexagonal in shape.

A cavity at the center of stationary base 10 forms storage area 25. In the preferred embodiment, storage area 25 is circular in shape and is adapted to store a plurality of preparatory cards and qualification cards.

Figure 4:
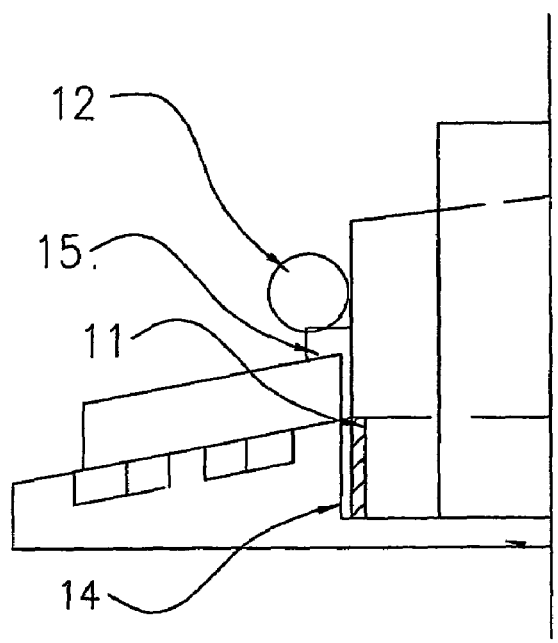
FIG. 4 is a detailed view of the of the mascot and metal strip used therein.

At the center of the cavity of stationary base 10 is a means for mounting rotatable drum 15 which will enable rotatable drum 15 to rotate. In the preferred embodiment, rotatable drum 15 is mounted by means of a pin type connection. Rotatable drum 15 can be made of any solid material including wood or stiff cardboard, but is typically made of the same material as stationary base 10. Rotatable drum 15 allows all players to face the game without having to move the game. On each turn by a player, a player turns rotatable drum 15 in a clockwise or counterclockwise direction so that rotatable drum 15 faces the next player. The position of each player is determined by means of a magnet inserted in a slot on stationary base 10, as best seen in FIG. 4. In the preferred embodiment, each player selects one of ten mascots, each having a magnet as its base. A metallic strip attached to rotatable drum 15 is biased towards the magnet at the base of a mascot inserted in a slot on stationary base 10 and rotatable drum 15 temporarily stops rotating. Rotatable drum 15 therefore can be successively rotated to the next player and may come to a rest when the metallic strip approaches the next magnetic base of a mascot.

Preparatory cardholders 30, qualification cardholder 35, mascot holder 40, score counter holder 45, and single preparatory card holder 50 are made of any solid material, preferably plastic. These are supported on rotatable drum 15 by any means for fixing an attachment. In the preferred embodiment, there are a total of 10 preparatory cardholders 30 positioned on top of rotatable drum 15. Single preparatory cardholder 50 has a window on its first side to display the answer to the questions on the other side of the card to the other players, and has two windows on the side facing the active player, one to display the preparatory question, and the other to display the choice of answers to the preparatory question.

Score counters are preferably cubes, although shapes are equally effective, and are made from a hard plastic. Each score counter is pre-assigned a value, typically, 1, 5, 10, 50 and 100, with the value displayed on a face of the cube. Thus, if a player has five counters with a value of one, that player may replace the five counters with a single counter with a value of 5. Preferably, the score counters are colored. Table 1 below indicates suggested colors to be used for the score counters, although a plurality of colors may be used according to the game designer preference.

TABLE 1

SUGGESTED COLORS FOR THE SCORE COUNTERS

| | SCORE COUNTER | | | | |
|---|---|---|---|---|---|
| | 1 | 5 | 10 | 20 | 50 |
| SUGGESTED COLOR | YELLOW | RED | BLUE | GREEN | WHITE |

Qualification Cards

Figure 6:
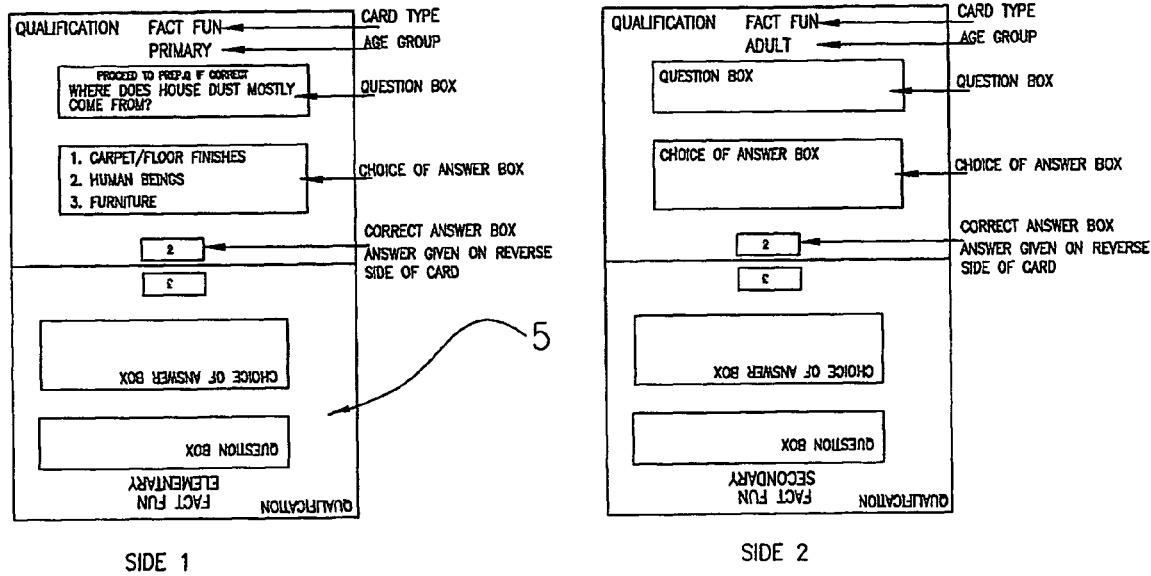
FIG. 6 is a view of each side of an embodiment of a qualification card.
Figure 7:
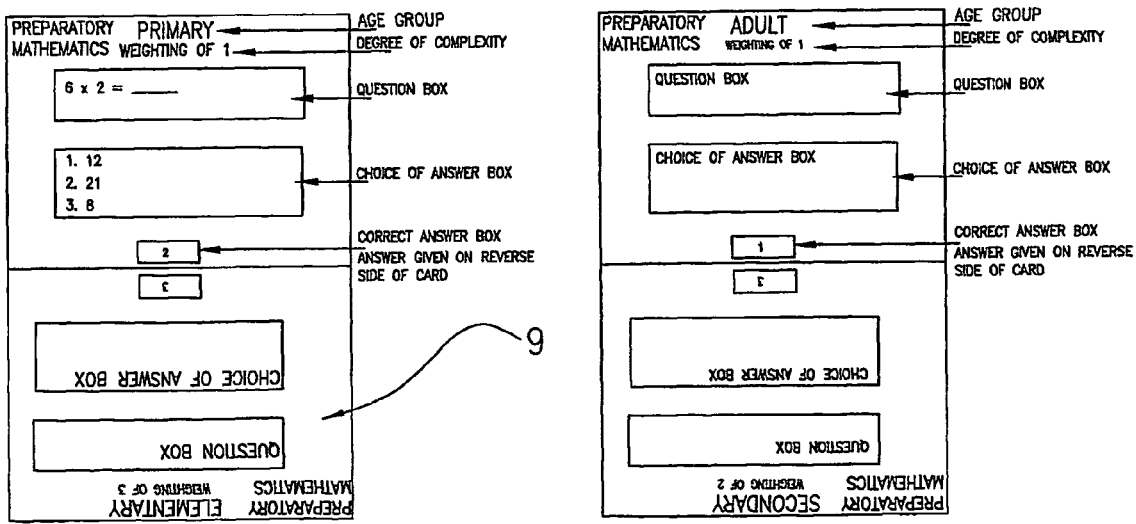
FIG. 7 is a view of each side of an embodiment of a preparatory card.

The plurality of qualification questions for various skill levels are preferably structured to parallel examination-type questions in subjects such as mathematics, geography, history, etc. The qualification questions on the qualification cards are designed to be of a type and style that will allow the players to gain knowledge in that subject matter. As best seen in FIG. 6, the qualification cards are comprised of a qualification question for each age group, a set of possible answers, and a corresponding qualification answer for each question. Table 2 below sets out examples of eight different types of qualification cards, which are randomly mixed and drawn from the complete set of qualification cards. Table 2 illustrates typical qualification questions by way of example only. The game will have a plurality of qualification card types and plurality of qualification questions. In the preferred embodiment, there will be eight different qualification card types randomly selected from the complete set of qualification cards. Other qualification card types can be introduced to the game. The number of cards in each qualification card type may be altered.

TABLE 2

EXAMPLES OF DIFFERING QUALIFICATION CARDS

| CARD TYPE | BASIC DESCRIPTION | EXAMPLE OF THE CARD TYPE | NUMBER OF CARDS |
|---|---|---|---|
| TYPE 1 | Preventative Cards | You have taken sick. Miss a turn. | 25 |
| TYPE 2 | Subject Chooser | Answer a physics question. | 200 |
| TYPE 3 | Fact Fun | Where does house dust mostly come from? a) carpet/floor finishes b) humans c) furniture Answer: a | 75 |
| TYPE 4 | Languages | The word GARCON in means a) boy b) girl c) man Answer: a | 75 |
| TYPE 5 | Mathematics | $(15 - 5) \times 8 - 5 = \_\_$ Answer: 75 | 75 |
| TYPE 6 | General Knowledge | How many faces does a tetrahedron have? a) 3 b) 4 c) 5 d) 6 Answer: b | 75 |
| TYPE 7 | Science | Cytology is the study of: a) fossils b) cells c) animals Answer: b | 75 |
| TYPE 8 | Computer Technology | What is a byte? The storage space allocated to one character. True or False Answer: True | 75 |

The qualification cards are comprised of four qualification questions, one for each age group. In the preferred embodiment, there are four age groups namely elementary, primary, secondary, and adult. Each of the age group qualification questions has a background color that represents each age group. For example, purple color may signify the elementary age group. The qualification question, if answered correctly allows the player to proceed to the preparatory questions.

The qualification cards are seen as a way of limiting the individuals from answering the preparatory questions. The qualification cards introduce an element of surprise in the game and thus make the game interesting to play, with the preparatory cards making it educational and assist in preparing the player for an examination. Not all of the qualification cards need include questions as illustrated above. Furthermore, besides educational subject matter, qualification cards may include questions on a wide variety of topics such as sports and entertainment.

Preparatory Cards

The subject areas for the preparatory cards are subjects normally taken at school, college, or other educational institutions. For example, in a high school, there may be ten In an alternative embodiment, the preparatory cards may be modified for advanced players by creating a set of preparatory cards for specialized subject groups. For example, the game may be played at the University level for a specialized subject area such as Civil engineering. The preparatory cards can cover a complete range of subject groups.

Table 3 illustrates typical preparatory questions in the area of mathematics for different age groups in varying degrees of complexity.

TABLE 3

EXAMPLE OF MATHEMATICS QUESTION BY AGE GROUP/DEGREE OF COMPLEXITY

| DEGREE OF COMPLEXITY/ AGE GROUP | BASIC Score = 1 | INTERMEDIATE Score = 2 | ADVANCED Score = 3 |
|---|---|---|---|
| Elementary | 2 + 2 = ___ answer: 4 | 2 + 2 + 6 = ___ answer: 10 | 2 + 3 − 2 = ___ answer: 3 |
| Primary | 6 × 2 = ___ answer: 12 | 2 × 2 × 6 = ___ answer: 24 | (2 + 3) × 3 = ___ answer: 15 |
| Secondary | 12 × ⅔ = ___ answer: 32 | (12 × ⅔)/2 = ___ answer: 27 | (12 × ⅔)/(6 × 3) = ___ answer: 3 |
| Adult | (12 × ⅔) × ½ = ___ answer: 16 | (12 × ⅔)/(3 × 2) = ___ answer: 9 | (12 × ⅔) × (5 × 3) = ___ answer: 540 | key subjects; namely Mathematics; English; Geography; Physics; Chemistry; Biology; Computer Science; History; Religious Studies and General Knowledge. For college or university level, the subjects can range from those appropriate for dentistry assistant training, legal secretary training, and library sciences. The subjects are adaptable for any program of study, and for less educational topics such as sports and entertainment.

The subject matter and form of the preparatory questions are of a type and form that are similar to examination questions. Such forms of questions include multiple choices, "yes or no" type, "true or false" type, graphical type, selection of phrases, and mathematical representations.

The plurality of preparatory cards are divided into subject groups. In the preferred embodiment, the preparatory cards are divided into ten major subject groups. The plurality of preparatory questions in each subject group are further divided into age groups so that a player in that age group will be awarded the same points as those of the other age groups if the preparatory question is answered correctly. In the preferred embodiment, there are four age groups namely, elementary, primary, secondary, and adult. Each of the age group questions has a background color that represents that age group in the game. The preparatory cards are comprised of four preparatory questions, one for each age group. Each preparatory question is assigned a score according to the degree of complexity. Typically, a basic question in any age group will be assigned a score of "1", an intermediate level question will be assigned a score of "2", and an advanced level question will be assigned a score of "3". By introducing differing levels of complexity in the question, the game exposes the individuals to both lower and higher knowledge levels for that individual, and is educated accordingly. The levels may be selected prior to the active player receiving the preparatory question, or in alternative embodiments, the active player may view all three questions and select one to answer. Alternatively, the qualification card may determine which level to answer.

Method of Playing the Game

The roll of the dice is taken by each of the players and the one with the highest score begins the game. If two or more players have the same score, the process of rolling the dice is repeated for these players until the players with the least score are eliminated.

The length of the game is decided by predetermining a winning score. In the preferred embodiment, the minimum winning score is two hundred points and the maximum score is nine hundred points. Mascots are chosen by the players from the storage box and inserted in the player's position. The players select a set of preparatory cards based on the subject area of choice. The selected set of preparatory cards are placed in the plurality of preparatory cardholders 30 adapted to hold a plurality of sets of preparatory cards positioned on rotating drum 15.

Any player who cheats in the game and is caught is eliminated from the game and cannot play again in the game. When the player answers the questions, others in the game should be silent so as not to disturb the concentration of the active player. Talking is permitted in between the successive selections or during the answering of the qualification cards, but not during the answering of the preparatory cards.

The qualification cards are designed to permit certain luck of the draw events to take place to make the game more interesting to play. Therefore, before selecting a preparatory card, a qualification card is selected. The qualification question on the qualification card must be answered correctly in order to proceed to the preparatory question. Alternatively, the qualification card imposes some condition that must be met prior to continuing with the game. For example, they player may miss a turn, or be imposed with some other form of condition that must be followed, or be given the opportunity to answer a particular type of qualification questions.

If the player gives the corresponding qualification answer to the qualification question, a preparatory question is selected and placed in single preparatory cardholder slot 50 so that all the non-active players can view the answer on the back of preparatory card. There are several ways in which the subject matter of the preparatory card can be determined. In a preferred embodiment the active player can select the subject. In an alternative embodiment, the qualification card will determine the subject matter. In yet other embodiments, each player will only be allowed to obtain a predetermined number of points from each subject, thus requiring the winning player to have a broad knowledge in many of the different subjects.

If the active player gives the corresponding preparatory answer to the preparatory question, the player receives a score. The number of points awarded is determined by multiplying the score with the roll of a dice. For example, if a "3" is rolled on the dice, and the score received is "3", then the points gained in answering the preparatory question correctly is "9". Then nine score counters are picked-up and placed on the score register. Other means of determining the points are also available, such as using the f course The game will terminate when the winning score is achieved as previously decided at the beginning of the game. In one embodiment, a certificate that is a high quality and well-designed document which has empty slots, is completed by a player, and presented to the declared winner of the game. This certificate can be displayed on the wall to encourage the younger players in the game to do well next time. Older players may simply walk away with the satisfaction of winning the game.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. An educational game, comprising:
   (a) a first set of cards for at least one subject, each of said cards in said first set of cards having a first question for presentation to a player of the game, and a corresponding first answer, and for which said player receives no score for answering correctly; and
   (b) a second set of cards for at least one subject, each of said cards in said second set having a second question for presentation to said player after said player has provided said first answer to said first question, and a corresponding second answer; and for which said player, on providing said second answer, receives a score.

2. The game of claim 1 wherein each of said first set of cards include a plurality of questions and corresponding answers for a variety of skill levels.

3. The game of claim 2 wherein each of said first set of cards further include a plurality of questions and corresponding answers for a variety of age groups.

4. The game of claim 3 wherein each of said second set of cards include a plurality of questions and corresponding answers for a variety of skill levels.

5. The game of claim 4 wherein each of said second set of cards further include a plurality of questions and corresponding answer for a variety of age groups.

6. The game of claim 5 wherein said first question and second question are selected from standardized examination questions.

7. The game of claim 6 wherein said score received for providing said second answer is at least partially random.

8. The game of claim 1 further comprising a rotatable drum for display of and access to said first set of cards and said second set of cards and a stationary base for holding said rotatable drum.

9. The game of claim 8 further comprising a magnetic mascot for said player positionable on said stationary base.

10. The game of claim 9 wherein a metallic strip is positioned on said rotatable drum such that when said rotatable drum is rotated, said metallic strip will be biased to said magnetic mascot.

11. The game of claim 10 wherein said second set of cards, when not in use are storable within said stationary base below said rotatable drum.

12. The game of claim 11 wherein said second set of cards are organizable by subject matter in a plurality of slots on said rotatable drum.

13. The game of claim 12 wherein said first set of cards are positioned within a qualification card holder slot on said rotatable drum.

14. The game of claim 13 further comprising score counters organizable in a score counter holder slot on said rotatable drum.

15. The game of claim 14 wherein a plurality of elongated slots are positioned on the perimeter of said stationary base.

16. A method for playing an educational game wherein a player's turn comprises:
   (a) receiving a first question listed on a first card selected from a first set of cards;
   (b) providing a first response to said first question;
   (c) if said first response is the corresponding answer to said first question, not receiving a score and receiving a second question listed on a second card selected from a second set of cards;
   (d) providing a second response to said second question; and
   (e) if said second response is the corresponding answer to said second question, receiving a score.

17. The method of playing an educational game of claim 16 wherein said score is multiplied by a number randomly generated by a roll of a die to determine a value of points received by said player.

18. The method of playing an educational game of claim 16 wherein said player, when receiving said value of points, receives score counters for placement on a stationary base for a value equal to said value of points, said score counters organizable in a plurality of elongated slots positioned on the perimeter of said stationary base.

19. The method of playing an educational game of claim of claim 17, wherein said player wins when said player receives points at least equal to a predetermined winning number.

* * * * *